W. J. CLARK.

Manufacture of Bolts.

No. 6,291. Reissued Feb. 16, 1875.

WITNESSES

W. T. Newman.

E. J. Nottingham

INVENTOR

William J. Clark

By Lepper & Lepper Attorneys.

THE GRAPHIC CO. PHOTO-LITH. 39 & 41 PARK PLACE, N.Y.

UNITED STATES PATENT OFFICE.

WILLIAM J. CLARK, OF MILLDALE, CONNECTICUT.

IMPROVEMENT IN THE MANUFACTURE OF BOLTS.

Specification forming part of Letters Patent No. 43,669, dated August 2, 1864; antedated February 2, 1864; reissue No. 1,916, dated March 28, 1865; reissue No. 6,291, dated February 16, 1875; application filed October 31, 1873.

*To all whom it may concern:*

Be it known that I, WILLIAM J. CLARK, of Milldale, (formerly of Southington,) county of Hartford and State of Connecticut, have invented certain new and useful Improvements in the Manufacture of Bolts from Round Rods or Bars; and that the following is a full, clear, and exact description of the same.

According to my invention, I make an angular-necked round-stemmed headed bolt-blank from a round piece of iron, by first forming the neck into an angular shape in cross-section by lateral pressure at all sides simultaneously, and then, while the said piece is firmly held in proper position, forming its projecting end into a protuberant head of the desired contour by upsetting against the dies, as an anvil, by suitable machinery, that acts to upset the metal against the anvil ends of the closed dies, and form the head by a motion in the line of the axis of the bolt-blank.

In order that my invention may be fully understood, I have represented in the accompanying drawings, and will proceed to describe, the dies which I have used in manufacturing bolt-blanks according to my invention.

Figure 1:
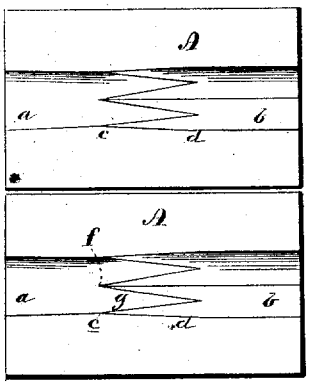
Figure 2:
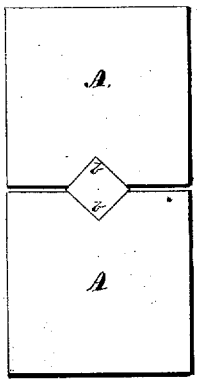
Figure 3:
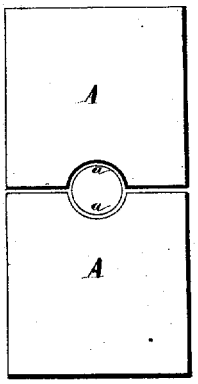
Figure 4:
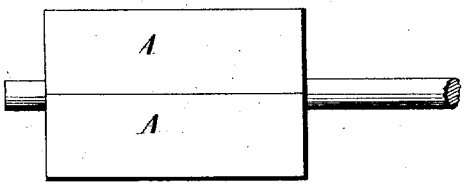
Figure 5:
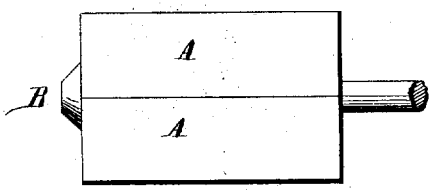
Figure 6:
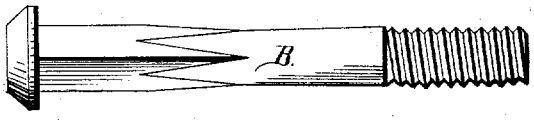

In the drawings, Figure 1 is a view of the dies in plan, opened so as to show the groove in each part thereof. Fig. 2 is a view of the anvil end of the closed dies. Fig. 3 is a similar view of the opposite end of the closed dies. Fig. 4 is a view in side elevation of my invention, showing the bolt-blank inclosed in the dies before the upsetting of the head. Fig. 5 is a view of the same after the head of the bolt-blank has been upset. Fig. 6 is a view of a bolt with one form of head made in my said dies according to my invention.

A A are the dies, provided each with a groove composed of a portion, *a*, which is semicircular in cross-section, and a portion, *b*, angular in cross-section. These two portions, *a* and *b*, are merged into each other, substantially as shown, the angular edge *f* vanishing into the curved surface, and the portions *g* of said curved surface vanishing into the flat surface of the angular portion.

In order that the rod from which the blanks are formed may be changed by the dies, so that a portion of it within the dies shall be angular, and a portion circular, or nearly so, in cross section, the curved surface is preferably made to slightly diminish in diameter as it approaches the angular portion of the groove, as shown between *c* and *d*.

The anvil ends of the dies, as shown in Figs. 1 and 2, are formed so as not to inclose the metal when the protuberant end of the blank is being formed into a head by upsetting the metal thereon as an anvil.

The head, whether of the shape shown, or of any other desirable shape, is formed by any suitable machinery that acts to form the head by driving the metal of the protuberant end of the rod against the anvil end of the closed dies, the said dies only giving shape to the head upon its under side, and the said upsetting machinery acting substantially in the line of the axis of the bolt-blank.

The operation of the dies is as follows: A round piece or rod of metal, suitably heated, is placed between the open swaging-dies, with a sufficient portion protruding at the anvil ends thereof to form the head. A lateral pressure is then brought against the dies, and they are forced together, giving to the metal substantially the angular shape of the matrix formed by the dies. While the metal remains thus held, the upsetting machinery drives the protuberant end of the rod or piece longitudinally against the anvil ends of the closed dies, thereby forming the bolt-head by upsetting the metal against the anvil ends of the dies, which only shape its under surface.

I claim—

1. The process, substantially as hereinbefore set forth, of forming from a round piece of metal a headed bolt-blank having an angular neck and a round stem, which process consists in subjecting a portion of the length of the round piece of metal to lateral swaging or compression on all sides simultaneously to form the angular neck, and while the piece is firmly held with the neck portion inclosed at all sides, upsetting the projecting end of the swaged piece of metal to form the head of the bolt-blank.

2. The process, substantially as hereinbefore set forth, of forming the angular neck and protuberant head of a bolt, which consists in subjecting a round piece of metal to lateral swaging between angular-grooved dies, the end surfaces of which dies when closed form the anvil against which the projecting end of the swaged piece of metal is upset and formed into a head by proper machinery.

3. The swaging-dies, made substantially as hereinbefore set forth, so that one portion of the cavity inclosed by them is round, and another portion of said cavity is angular, and the said two portions are connected by an intervening portion of less transverse area than either of the said first two portions, and the ends of the said dies when closed form an anvil at the end having the angular opening, upon which is formed the head of the bolt-blank by proper machinery.

Witness my hand this 10th day of October, 1873.

WILLIAM J. CLARK.

Witnesses:
W. L. BEIMEM,
W. H. ISAACS.